US009852683B2

(12) United States Patent
Liu

(10) Patent No.: US 9,852,683 B2
(45) Date of Patent: Dec. 26, 2017

(54) DISPLAY AND SUB-PIXEL DRIVING METHOD THEREIN

(71) Applicant: AU Optronics Corporation, Hsin-Chu (TW)

(72) Inventor: Yi-Cheng Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 30 days.

(21) Appl. No.: 14/465,285

(22) Filed: Aug. 21, 2014

(65) Prior Publication Data

US 2015/0339975 A1 Nov. 26, 2015

(30) Foreign Application Priority Data

May 23, 2014 (TW) ............................. 103118124 A

(51) Int. Cl.

| | |
|---|---|
| ***G06F 3/038*** | (2013.01) |
| ***G09G 5/00*** | (2006.01) |
| ***G09G 3/3233*** | (2016.01) |
| ***G09G 5/10*** | (2006.01) |
| ***G09G 3/20*** | (2006.01) |
| ***H05B 37/02*** | (2006.01) |

(52) U.S. Cl.

CPC ......... *G09G 3/3233* (2013.01); *G09G 3/2074* (2013.01); *G09G 5/10* (2013.01); *H05B 37/02* (2013.01); *G09G 2300/0452* (2013.01); *G09G 2300/0804* (2013.01); *G09G 2310/0264* (2013.01); *G09G 2320/043* (2013.01)

(58) Field of Classification Search

CPC ...... G09G 3/3233; G09G 5/10; G09G 3/2074; G09G 2310/0264; G09G 2300/0443; G09G 2330/08; G09G 2330/10; G09G 2320/04; G09G 2320/043; G09G 2320/041; G09G 2320/045; G09G 2300/0804; G09G 2300/0452; H05B 37/02; H01L 2251/568

See application file for complete search history.

(56) References Cited

U.S. PATENT DOCUMENTS 6,515,434 B1 * 2/2003 Biebl ................... B60Q 1/2696 315/185 R
2006/0022909 A1 * 2/2006 Kwak .................. G09G 3/3233 345/76

(Continued)

FOREIGN PATENT DOCUMENTS

| | | | |
|---|---|---|---|
| CN | 1737894 | A | 2/2006 |
| CN | 103000132 | A | 3/2013 |
| TW | 201036487 | A | 10/2010 |

*Primary Examiner* — Ilana Spar
*Assistant Examiner* — Brent D Castiaux
(74) *Attorney, Agent, or Firm* — WPAT, PC

(57) ABSTRACT

A display and a sub-pixel driving method therein are provided. The display includes a data line and a sub-pixel. The data line is configured to provide a data voltage signal. The sub-pixel includes a driving unit, a first light-emitting unit and a second light-emitting unit. The driving unit is configured to generate a driving current according to the data voltage signal. The first light-emitting unit is configured to emit light by the driving current and generate an operating voltage according to the driving current. The second light-emitting unit is selectively substituted for the first light-emitting unit to emit light according to a variation of the operating voltage.

5 Claims, 5 Drawing Sheets

200

(56) References Cited

U.S. PATENT DOCUMENTS

| | | | | |
|---|---|---|---|---|
| 2006/0087478 | A1 | 4/2006 | Eom | |
| 2007/0242004 | A1 | 10/2007 | Oooka et al. | |
| 2008/0062096 | A1* | 3/2008 | Yamashita | G09G 3/2074 345/82 |
| 2009/0174628 | A1* | 7/2009 | Wang | G09G 3/3225 345/76 |
| 2012/0194087 | A1* | 8/2012 | Lu | H05B 33/0851 315/192 |

* cited by examiner

DISPLAY AND SUB-PIXEL DRIVING METHOD THEREIN

RELATED APPLICATIONS

This application claims priority to Taiwan Application Serial Number 103118124 filed May 23, 2014 which is herein incorporated by reference.

BACKGROUND

Technical Field

The present disclosure relates to a display. More particularly, the present disclosure relates to a light-emitting diode display.

Description of Related Art

Since micrometer scale-light-emitting diode (μ-LED) display uses μ-LED components as pixels for display, it is unnecessary to additionally set a backlight module in the μ-LED display. Therefore, the μ-LED display has advantages such as simple architecture, thin thickness, high contrast, wide viewing angle, fast response, etc. However, since technique for bonding LED components on the glass substrate is immature, LED components have worse contact with transistors of the glass substrate. When the display is turned on in a long period, inner resistance of a LED component is increased. Therefore, when the LED component receives the same driving current, operating voltage of the LED component is increased such that illumination efficiency of the LED component is reduced. Since illumination efficiency of the LED component is reduced, luminance of pixels of a display image is decreased, resulting in that luminance of displayed image becomes non-uniform. In some cases, dark spots even exist in the image displayed on the display. When aforementioned conditions are occurred, abnormal pixels of the image displayed on the μ-LED display fail to be fixed.

SUMMARY

In order to solve aforementioned problems, the present disclosure is to provide a display and a sub-pixel driving method. When an original light-emitting component of the sub-pixel is abnormal, another light-emitting component is substituted for the original light-emitting component to emit light.

One aspect of the present disclosure is to provide a display. The display includes a data line and a sub-pixel. The data line is configured to provide a data voltage signal. The sub-pixel includes a driving unit, a first light-emitting unit and a second light-emitting unit. The driving unit is configured to generate a driving current according to the data voltage signal. The first light-emitting unit is configured to emit light by the driving current and generates an operating voltage according to the driving current. The second light-emitting unit is selectively substituted for the first light-emitting unit to emit light according to a variation of the operating voltage.

Another aspect of the present disclosure is to provide a sub-pixel driving method for a sub-pixel. The sub-pixel includes a first light-emitting component and a second light-emitting component. The sub-pixel driving method includes: generating a driving current according to a data voltage signal; driving the first light-emitting component to emit light by the driving current and generating an operating voltage by the first light-emitting component according to the driving current; and selectively substituting the second light-emitting component for the first light-emitting component to emit light according to a variation of the operating voltage.

Further one aspect of the present disclosure is to provide a display. The display includes a data line and a sub-pixel. The data line is configured to provide a data voltage signal. The sub-pixel includes a first light-emitting component, a second light-emitting component, a first transistor, a second transistor and a comparator. The first light-emitting component includes a first terminal and a second terminal. The first terminal of the first light-emitting component is configured to receive a first voltage. The second light-emitting component includes a first terminal and a second terminal. The first terminal of the second light-emitting component is configured to receive the first voltage. The first transistor includes a first terminal, a second terminal and a control terminal. The first terminal of the first transistor is configured to receive a driving current corresponding to the data voltage signal, and the second terminal of the first transistor is electrically coupled to the second terminal of the first light-emitting component. The second transistor includes a first terminal, a second terminal and a control terminal. The first terminal of the second transistor is configured to receive the driving current, and the second terminal of the second transistor is electrically coupled to the second terminal of the second light-emitting component. The comparator includes a first input terminal, a second input terminal and an output terminal. The first input terminal is electrically coupled to the second terminal of the first light-emitting component and the second terminal of the first transistor, the second input terminal is configured to receive a reference voltage, and the output terminal is electrically coupled to the control terminal of the first transistor and the control terminal of the second transistor.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
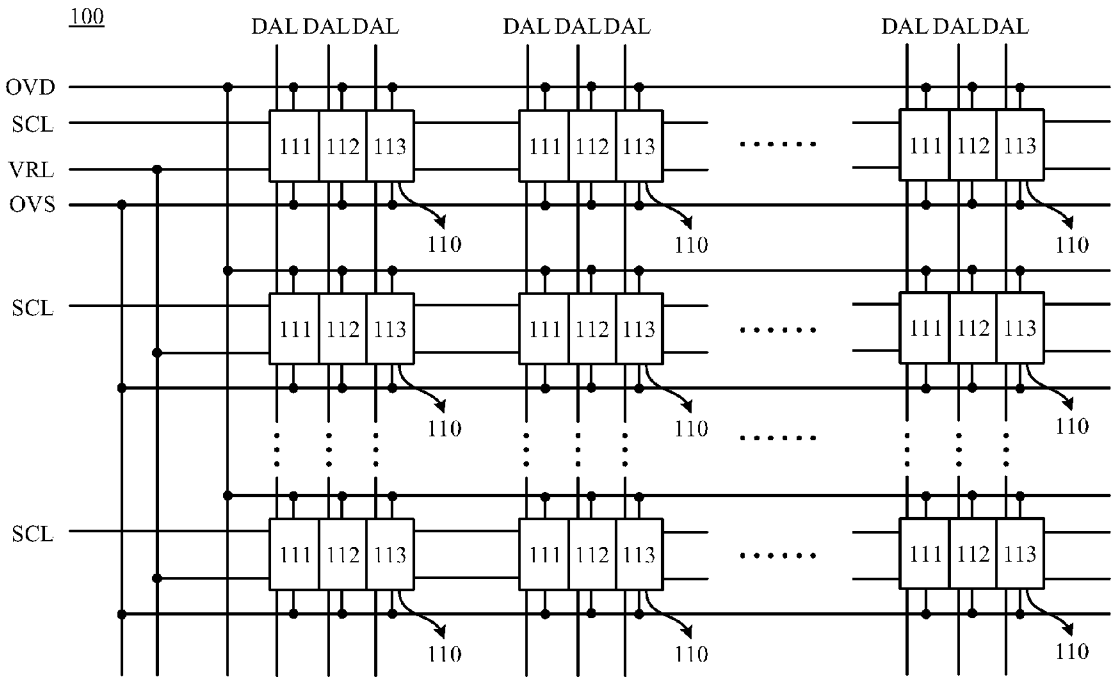
FIG. 1 is a schematic diagram illustrating a display according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a schematic diagram illustrating a display 100 according to one embodiment of the present disclosure. The display 100 includes several pixels 110, several scan lines SCL, several data lines DAL, a reference voltage line VRL, a supply voltage line OVD and a supply voltage line OVS. Each pixel includes sub-pixels 111, 112 and 113 configured to display red, green and blue, respectively. The scan line SCL is configured to provide a selection signal. The data line DAL is configured to provide a data voltage signal. The reference data line is configured to provide a reference voltage. When the selection signal conducts transistors of the sub-pixels 111, 112 and 113 (not shown in the figure), light emitting components of the sub-pixels 111, 112 and 113 (not shown in the figure) are driven by the data voltage to display luminance. In one embodiment, light emitting components includes micrometer scale-inorganic light emitting diode (μ-LED) or organic light-emitting Diode (OLED). In other words, the display 100 includes an μ-LED display or an OLED display.

Figure 2:
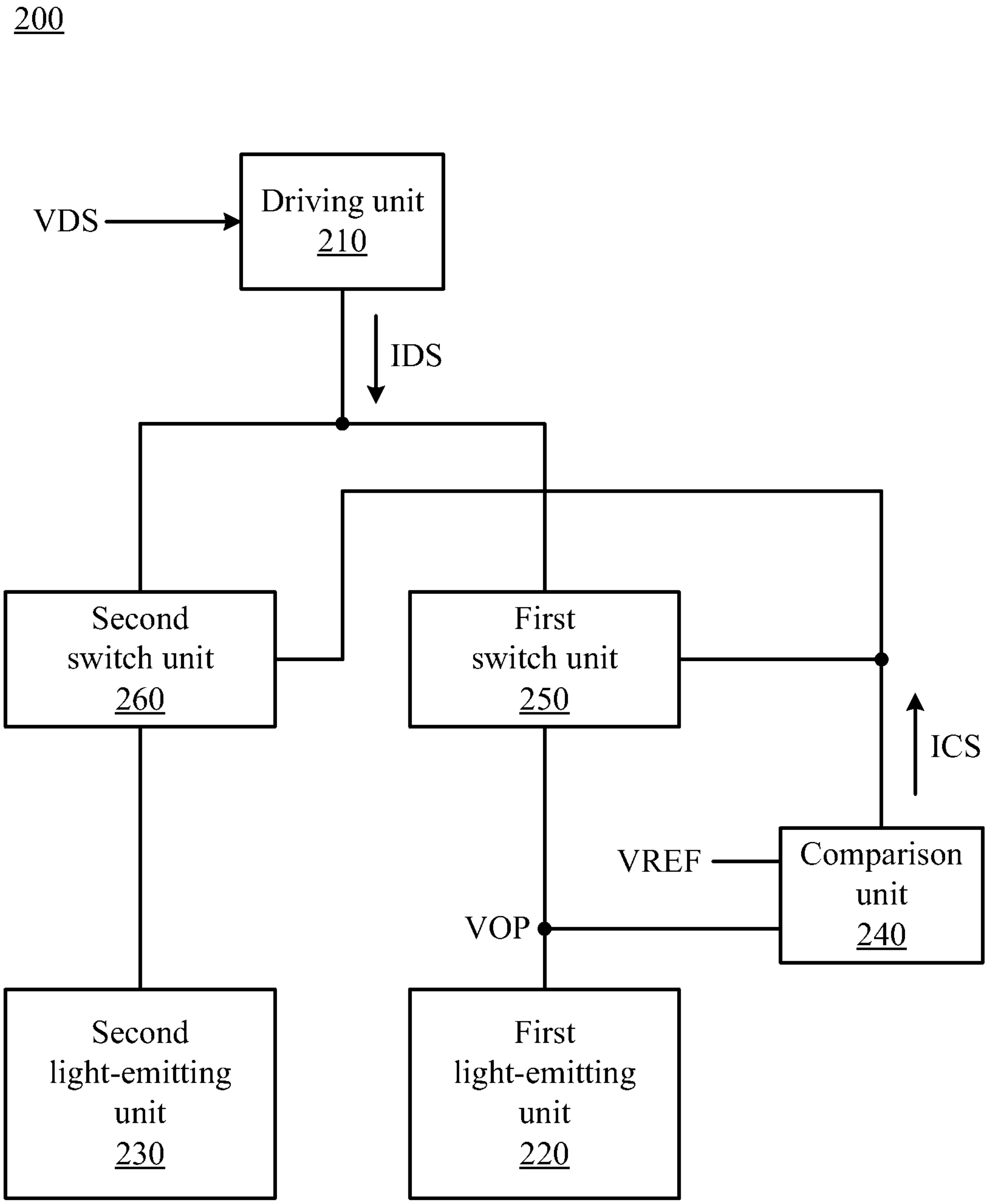
FIG. 2 is a block diagram illustrating a sub-pixel according to one embodiment of the present disclosure.

Reference is made to FIG. 1 and FIG. 2. FIG. 2 is a block diagram illustrating a sub-pixel 200 according to one embodiment of the present disclosure. The sub-pixel 200 can apply in the display 100 of FIG. 1, but the present disclosure is not limited thereto. The sub-pixel 200 includes a driving unit 210, a first light-emitting unit 220 and a second light-emitting unit 230. The driving unit 210 is configured to generate a driving current IDS according to a data voltage signal VDS. The first light-emitting unit 220 is configured to emit light by the driving current IDS, and configured to generate an operating voltage VOP according to the driving current IDS. The second light-emitting unit 220 is configured to be selectively substituted for the first light-emitting unit 210 to emit light according to a variation of the operating voltage VOP. In other words, when the driving unit 210 receives the data voltage signal VDS, the sub-pixel 200 display luminance by one of the first light-emitting unit 220 and the second light-emitting unit 230. In one embodiment, the first light-emitting unit 220 and the second light-emitting unit 230 includes μ-LED or OLED.

In one embodiment, the sub-pixel 200 further includes a comparison unit 240 configured to compare the operating voltage VOP with a reference voltage VREF so as to determine to drive the first light-emitting unit 220 or the second light-emitting unit 230 to emit light. Specifically, if the first light-emitting unit 220 is normal (e.g., contact of the light-emitting component is normal and not decay yet), the operating voltage VOP of the first light-emitting unit 220 formed by the received driving current IDS should be within in an operation range. If the first light-emitting unit 220 is abnormal (e.g., contact of the light-emitting component is abnormal or the light-emitting component is aged such that the inner resistance of the light-emitting component is increased), the operating voltage VOP of the first light-emitting unit 220 formed by the received driving current IDS would beyond the operation range. Accordingly, in one embodiment, a value of the reference voltage VREF is substantially larger than a value of the operation range. When the operating voltage VOP is substantially smaller than the reference voltage VREF, the first light-emitting unit 220 is normal. At this time, the sub-pixel 200 selects the first light-emitting unit 220 to emit light. When the operating voltage VOP is substantially larger than or equal to the reference voltage VREF, the first light-emitting unit 220 is abnormal. At this time, the sub-pixel 200 selects the second light-emitting unit 220 to emit light. In other words, the sub-pixel 200 selects the second light-emitting unit 220 substituted for to first light-emitting unit 230 to emit light.

Moreover, the user can adjust value of the reference voltage VREF externally so as to adjust criterion of illumination efficiency of the first light-emitting unit 220. Accordingly, the sub-pixel 200 can be operated more flexibly, and usage period of light-emitting component is increased.

In one embodiment, the sub-pixel 200 further includes a first switch unit 250 and a second switch unit 260. The first switch unit 250 is electrically coupled to the driving unit 210, the first light-emitting unit 220 and the comparison unit 240. The second switch unit 260 is electrically coupled to the driving unit 210, the second light-emitting unit 230 and the comparison unit 240. The comparison unit 240 compares the operating voltage VOP with the reference voltage so as to generate a control signal ICS. The control signal ICS is configured to conduct one of the first switch unit 250 and the second switch unit 260 such that one of the first light-emitting unit 220 and the second light-emitting unit 230 corresponding to the conducted one of the first switch unit and the second switch unit to emit light receives the driving current IDS and emits light. In one embodiment, when the operating voltage VOP is substantially smaller than the reference voltage VREF, the control signal ICS conducts the first switch units 250 and cuts off the second switch unit 260. Therefore, only the first light-emitting unit 220 can receive the driving current IDS and emit light at this time. When the operating voltage VOP is substantially larger than or equal to the reference voltage VREF, the control signal ICS cuts off the first switch units 250 and conducts the second switch unit 260. Therefore, only the second light-emitting unit 230 can receive the driving current IDS and emit light at this time.

The aforementioned operations can be implemented during a transient period before the display is turned on or before the display is turned off. Although reduction of illumination efficiency of light-emitting component is not improved yet, usage period of the display still can be increased and non-uniform luminance on the displayed image of the display still can be improved by aforementioned embodiments. Moreover, by adjusting the reference voltage VREF externally, the display can be operated more flexibly.

Figure 3:
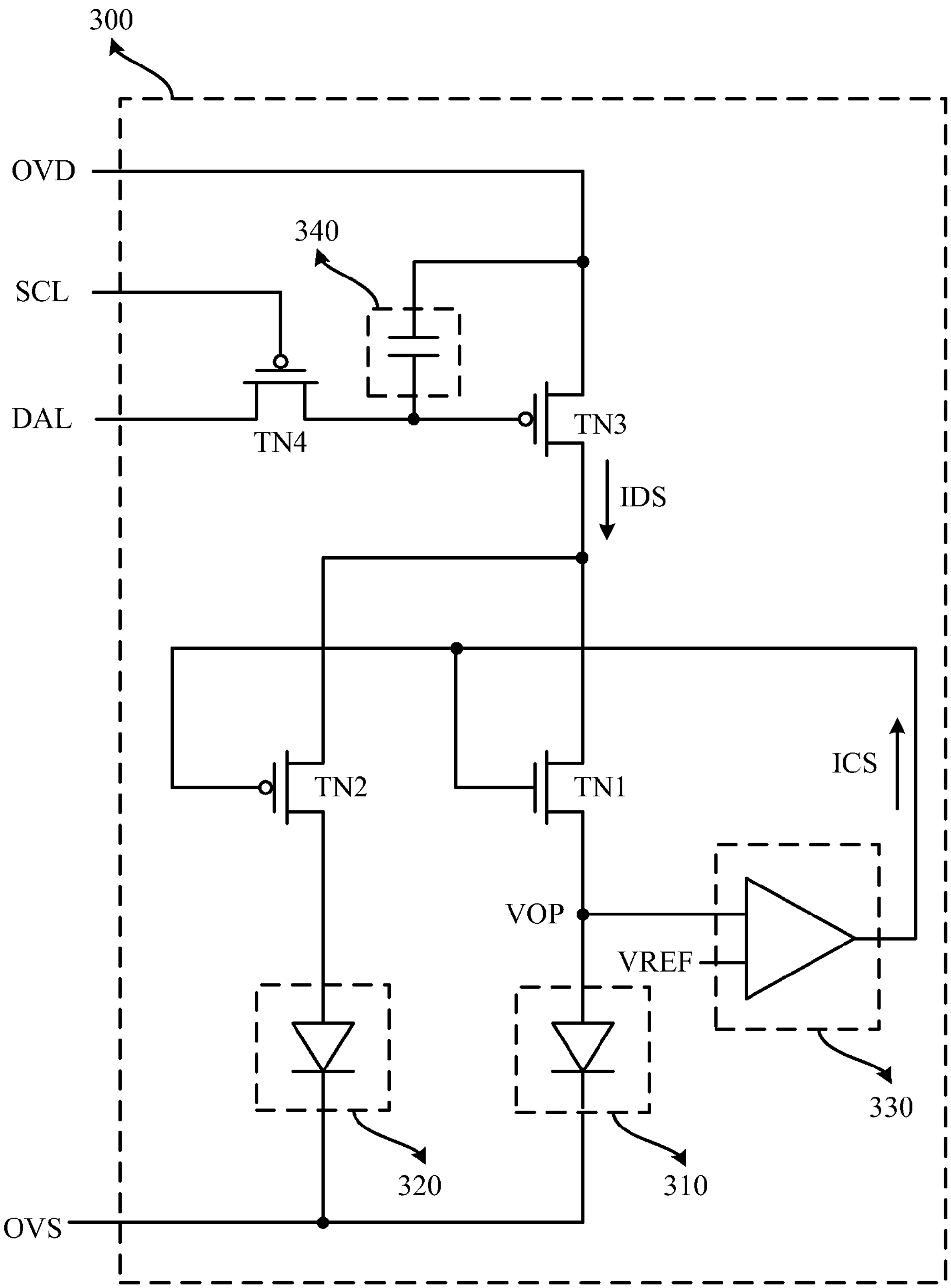
FIG. 3 is a circuit diagram illustrating a sub-pixel according to one embodiment of the present disclosure.

FIG. 3 is a circuit diagram illustrating a sub-pixel 300 according to one embodiment of the present disclosure. The sub-pixel 300 can apply in the display 100 of FIG. 1, but the present disclosure is not limited thereto. The sub-pixel 300 includes a first transistor TN1, a second transistor TN2, a first light-emitting component 310, a second light-emitting component 320 and a comparator 330. A first terminal of the first transistor TN1 and a first terminal of the second transistor TN2 are configured to receive the driving current IDS corresponding to the data voltage signal. A second terminal of the first transistor TN1 is electrically coupled to an anode terminal of the first light-emitting component 310.

A second terminal of the second transistor TN2 is electrically coupled to an anode terminal of the second light-emitting component 320. A cathode terminal of the first light-emitting component 310 and a cathode terminal of the second light-emitting component 320 are electrically coupled to the supply voltage line OVS and configured to receive a first voltage. A first input terminal of the comparator 330 is electrically coupled to the anode terminal of the first light-emitting component 310 and the second terminal of the first transistor TN1. A second input terminal of the comparator 330 is configured to receive the reference voltage VREF. An output terminal of the comparator 330 is electrically coupled to a control terminal of the first transistor TN1 and a control terminal of the second transistor TN2.

In one embodiment, characteristic of the first transistor TN1 and characteristic of the second transistor TN2 are complementary, i.e., the first transistor TN1 and the second transistor TN2 are unable to be conducted simultaneously. In other words, if the first transistor TN1 is a P-type MOSFET or a PNP transistor, the second transistor TN2 is a N-type MOSFET or an NPN transistor. If the first transistor TN1 is a N-type MOSFET or an NPN transistor, the second transistor TN2 is a P-type MOSFET or a PNP transistor.

In the present embodiment, t the first transistor TN1 is a N-type TFT (Thin Film Transistor), and the second transistor TN2 is a N-type TFT, but the present embodiment is not limited thereto.

In one embodiment, the sub-pixel further includes a third transistor TN3 and a capacitor 340. A first terminal of the third transistor TN3 is electrically coupled to the supply voltage line OVS, and is configured to receive a second voltage. A second terminal of the third transistor TN3 is electrically coupled to the first terminal of the first transistor TN1 and the first terminal of the second transistor TN2. A control terminal of the third transistor TN3 is electrically coupled to the data line DAL, and is configured to receive the data voltage signal VDS. A first terminal of the capacitor 340 is electrically coupled to the first terminal of the third transistor TN3. A second terminal of the capacitor 340 is electrically coupled the control terminal of the third transistor TN3.

In one operation, when the third transistor TN3 receives the data voltage signal through the data line DAL, the third transistor TN3 is conducted. Through capacitive coupling effect of the capacitor 340, the third transistor TN3 generates the driving current IDS according to the data voltage signal. The first light-emitting component 310 emits light by the driving current IDS, and generates the operating voltage VOP at the anode terminal of the first light-emitting component 310 according to the driving current IDS. The comparator 330 compares the operating voltage VOP with the reference voltage VREF so as to generate the control signal ICS to the first transistor TN1 and the second transistor TN2.

When the operating voltage VOP is substantially smaller than the reference voltage VREF, the control signal ICS is at high logic level. Since the first transistor TN1 is a N-type transistor and the second transistor TN2 is a P-type transistor, the first transistor TN1 is conducted and the second transistor TN2 is cut off. At this time, the first light-emitting component 310 keeps receiving the driving current IDS through the first transistor TN1 to emit light. When the operating voltage VOP is substantially larger than or equal to the reference voltage VREF, the control signal ICS is at low logic level. Therefore, the first transistor TN1 is cut off, and the second transistor TN2 is conducted. At this time, the second light-emitting component 320 is substituted for the first light-emitting component 310 to receive the driving current IDS to emit light through the second transistor TN2.

Similarly, the user can adjust value of the reference voltage VREF externally so as to adjust criterion of illumination efficiency of the first light-emitting component 310. Accordingly, the sub-pixel 300 can be operated more flexibly, and usage period of light-emitting component is increased.

In one embodiment, the sub-pixel 300 further includes a fourth transistor TN4. A first terminal of the fourth transistor TN4 is electrically coupled to the control terminal of the third transistor TN3 and the second terminal of the capacitor 340. A second terminal of the fourth transistor is electrically coupled to the data line DAL. A control terminal of the fourth transistor TN4 is electrically coupled to the scan line SCL, and is configured to receive a selection signal. When the selection signal conducts the transistor TN4, the third transistor TN3 receives the data voltage signal through the fourth transistor TN4, and generates the driving current IDS.

In the present embodiment, the third transistor TN3 and the fourth transistor TN4 are P-type TFTs, but the present embodiment is not limited thereto. In other embodiments, the third transistor TN3 and the fourth transistor TN4 can be N-type TFTs.

Figure 4:
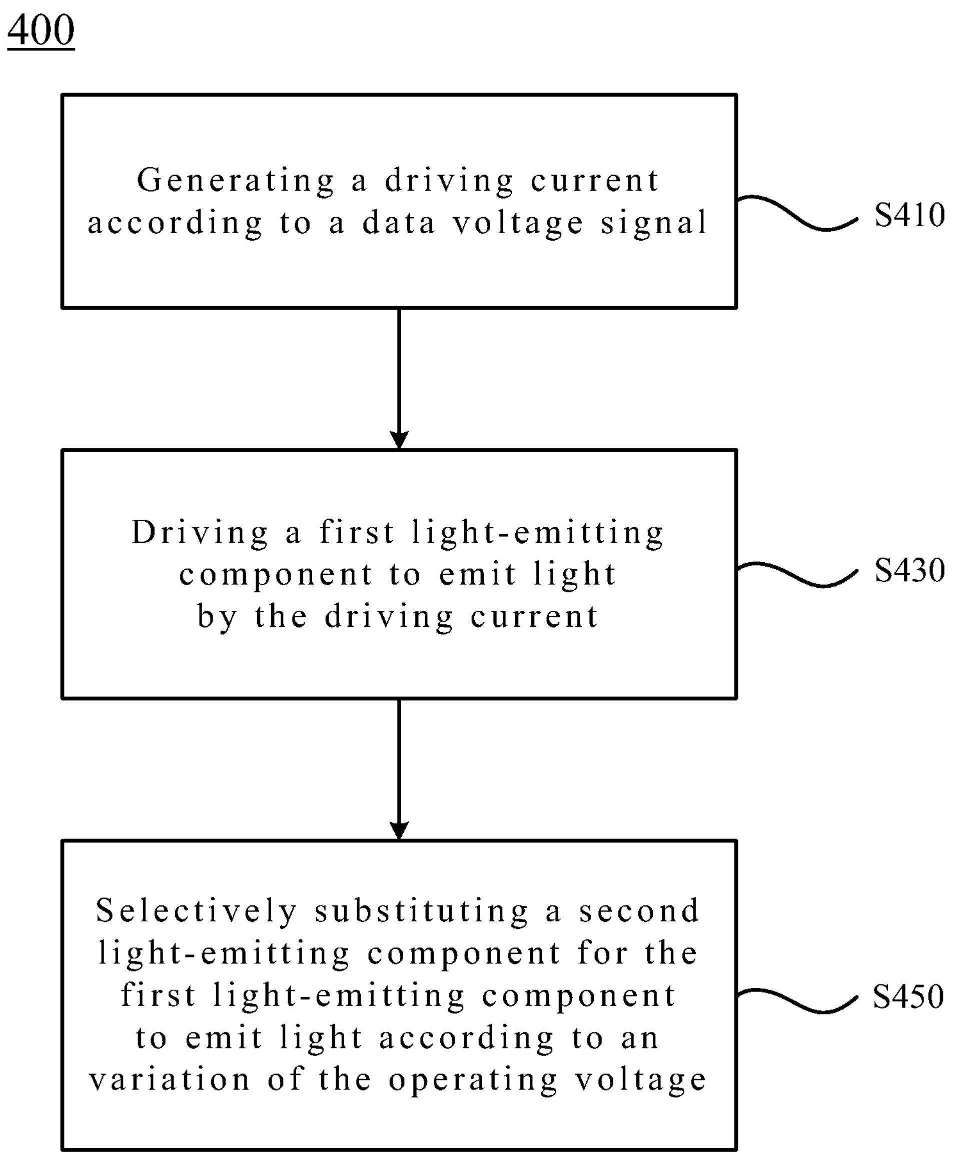
FIG. 4 is a flowchart illustrating a sub-pixel driving method according to one embodiment of the present disclosure.

FIG. 4 is a flowchart illustrating a sub-pixel driving method 400 according to one embodiment of the present disclosure. In order to clearly describe the present embodiment, the sub-pixel driving method 400 is described with the sub-pixel 200 of FIG. 2, but the present disclosure is not limited thereto. First, in operation S410, the driving current IDS is generated by the driving unit 210 according to the data voltage signal. The data voltage signal can be received through the data line DAL. Next, in operation S430, the first unit 220 is driven to emit light by the driving current IDS, and the operating voltage VOP is generated by the first light-emitting unit 220 according to the operating voltage. Next, in operation S450, the second light-emitting unit 230 is selectively substituted for the first light-emitting unit 220 to emit light according to a variation of the operating voltage VOP.

Figure 5:
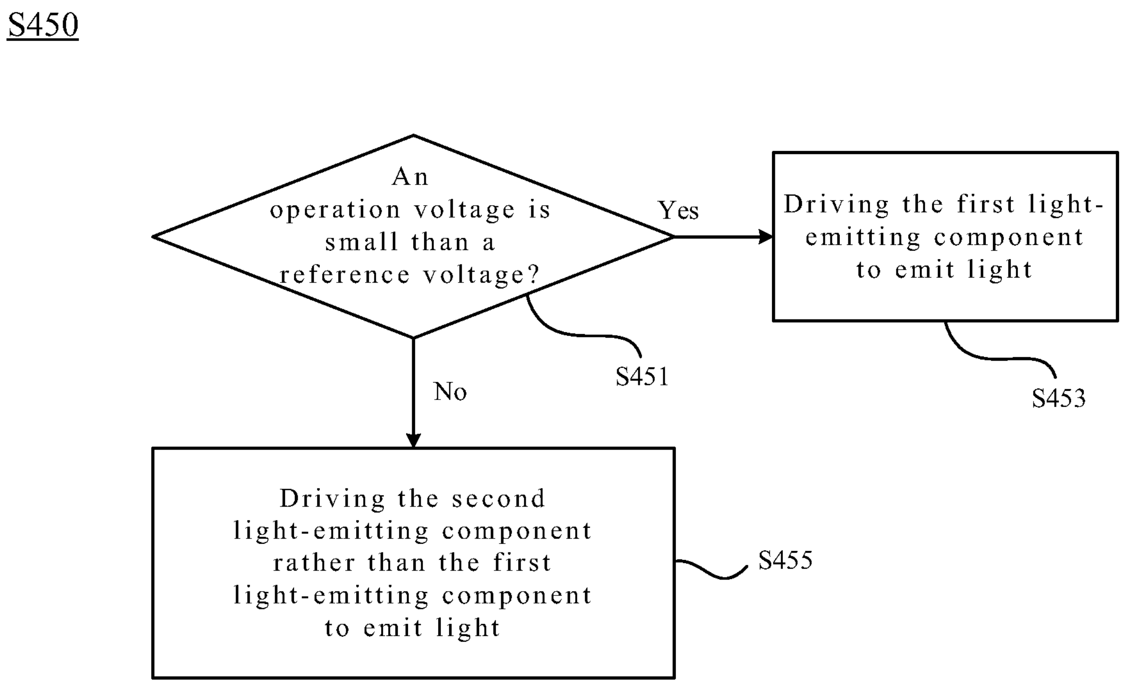
FIG. 5 is a flowchart illustrating one step of FIG. 4 according to one embodiment of the present disclosure.

In one embodiment, operation S450 further includes operations S451-S455. FIG. 5 is a flowchart illustrating one step of FIG. 4 according to one embodiment of the present disclosure. As shown in FIG. 5, in operation S451, the operating voltage VOP is compared with the reference voltage VREF by the comparison unit 240, and a determination is made as to whether the operating voltage VOP is substantially smaller than the reference voltage VREF. When the operating voltage VOP is substantially smaller than the reference voltage VREF, operation S453 is executed. In operation S453, the driving current IDS is provided to the first light-emitting unit 220 by the driving unit 210 such that the first light-emitting unit 220 is driven to emit light. When the operating voltage VOP is substantially larger than or equal to the reference voltage VREF, operation S4555 is executed. In operation S455, the driving current IDS is provided to the second light-emitting unit 230 by the driving unit 210 such that the second light-emitting unit 230 is driven to emit light.

When the display is turned on in a long period, inner resistance of a LED component is increased. Therefore, when the LED component receives the same driving current, operating voltage of the LED component is increased such that illumination efficiency of the LED component is reduced. Since illumination efficiency of the LED component is reduced, luminance of a pixel of a display image is decreased, resulting in that luminance of displayed image becomes non-uniform. In some cases, dark spots even exist in the image displayed on the display. When aforementioned conditions are occurred, abnormal pixels of the image displayed on the display fail to be fixed.

As illustrated from the aforementioned embodiments of the present disclosure, by comparing an operating voltage of an original light-emitting component of a sub-pixel with a reference voltage, a determination is made as to whether the original light-emitting component is abnormal. When the original light-emitting component of the sub-pixel is abnormal, another light-emitting component is substituted for the original light-emitting component to emit light. Therefore, non-uniform luminance of the displayed image on the display is improved, and usage period of the display is increased. Moreover, by adjusting the reference voltage externally, the display can be operated more flexibly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display, comprising:

a data line configured to provide a data voltage signal;

a sub-pixel, comprising:

a first light-emitting component comprising a first terminal and a second terminal, wherein the first terminal is configured to receive a first voltage;

a second light-emitting component comprising a first terminal and a second terminal, wherein the first terminal is configured to receive the first voltage;

a first transistor comprising a first terminal, a second terminal and a control terminal, wherein the first terminal is configured to receive a driving current corresponding to the data voltage signal, and the second terminal is electrically coupled to the second terminal of the first light-emitting component;

a second transistor comprising a first terminal, a second terminal and a control terminal, wherein the first terminal is configured to receive the driving current, and the second terminal is electrically coupled to the second terminal of the second light-emitting component; and a comparator comprising a first input terminal, a second input terminal and an output terminal, wherein the first input terminal is directly connected to the second terminal of the first light-emitting component and the second terminal of the first transistor, the second input terminal is configured to receive a reference voltage, and the output terminal is electrically coupled to the control terminal of the first transistor and the control terminal of the second transistor;

wherein the control terminal of the first transistor and the control terminal of the second transistor are directly connected and the control terminal of the first transistor and the control terminal of the second transistor are controlled by a same signal.

2. The display of claim 1, wherein the sub-pixel further comprises:

a third transistor comprising a first terminal, a second terminal and a control terminal, wherein the first terminal is configured to receive a second voltage, the second terminal is electrically coupled to the first terminal of the first transistor and the first terminal of the second transistor, and the control terminal is electrically coupled to the data line; and a capacitor comprising a first terminal and a second terminal, wherein the first terminal is electrically coupled to the first terminal of the third transistor, and the second terminal is electrically coupled the control terminal of the third transistor.

3. The display of claim 2, wherein the sub-pixel further comprises:

a fourth transistor comprising a first terminal, a second terminal and a control terminal, wherein the first terminal is electrically coupled to the control terminal of the third transistor, the second terminal is electrically coupled to the data line, and the control terminal is configured to receive a selection signal.

4. The display of claim 1, wherein characteristic of the first transistor and characteristic of the second transistor are complementary.

5. The display of claim 1, wherein the first input terminal receives an operating voltage, when the operating voltage is substantially smaller than the reference voltage, the first transistor is turned on and the second transistor is turned off, when the operating voltage is substantially larger than the reference voltage, the first transistor is turned off and the second transistor is turned off.

* * * * *